June 4, 1968  E. FISCHER  3,386,132
EXTRUSION APPARATUS
Filed Oct. 22, 1965  3 Sheets-Sheet 3
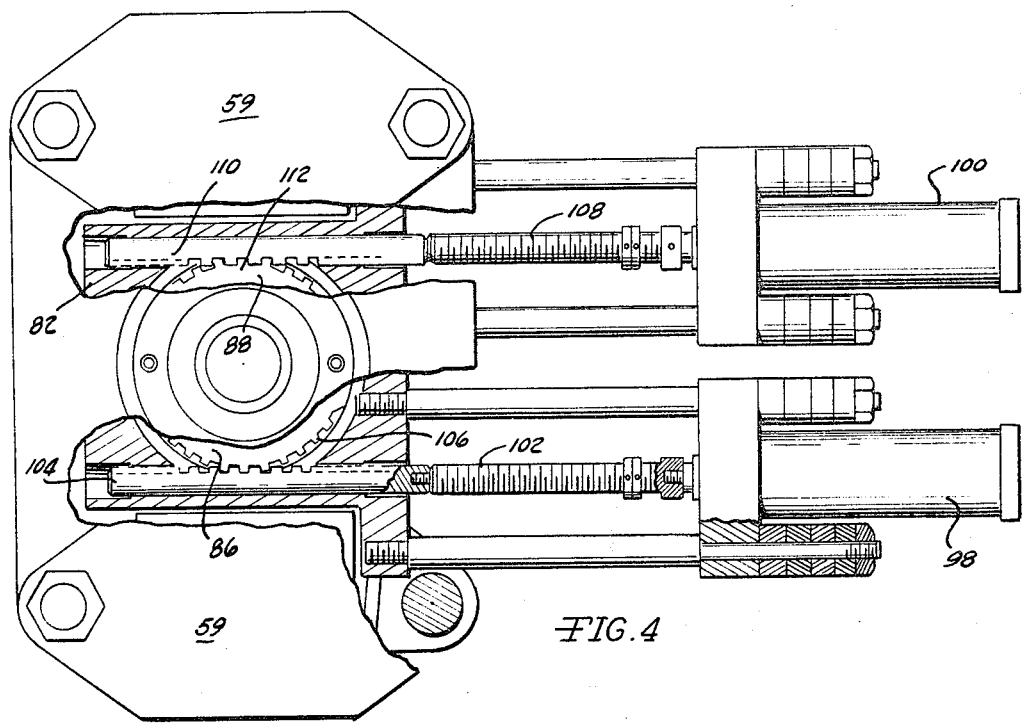
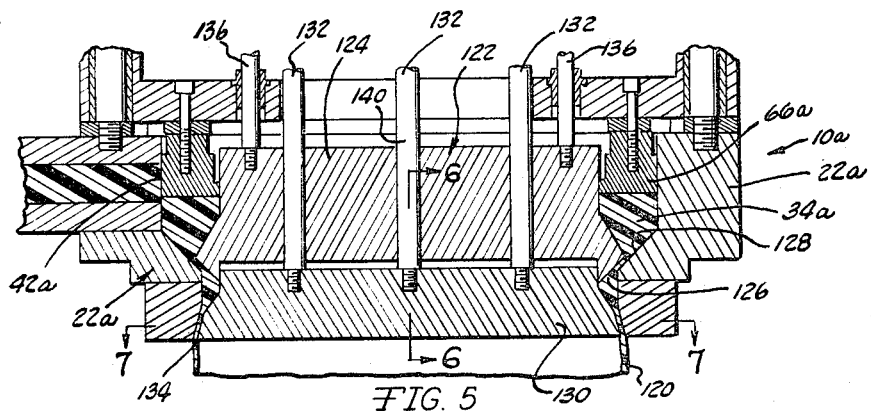
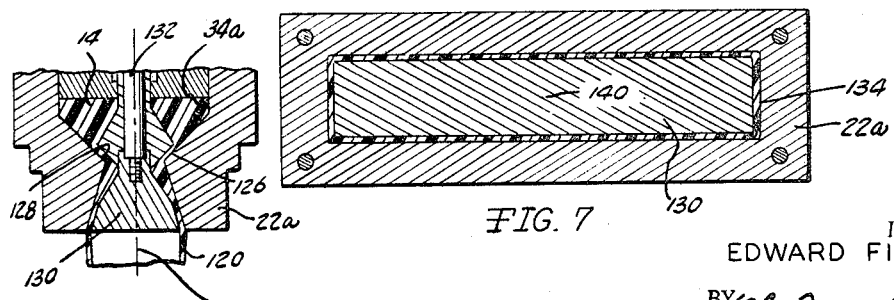
INVENTOR.
EDWARD FISCHER
BY Olsen and Stephenson
ATTORNEYS

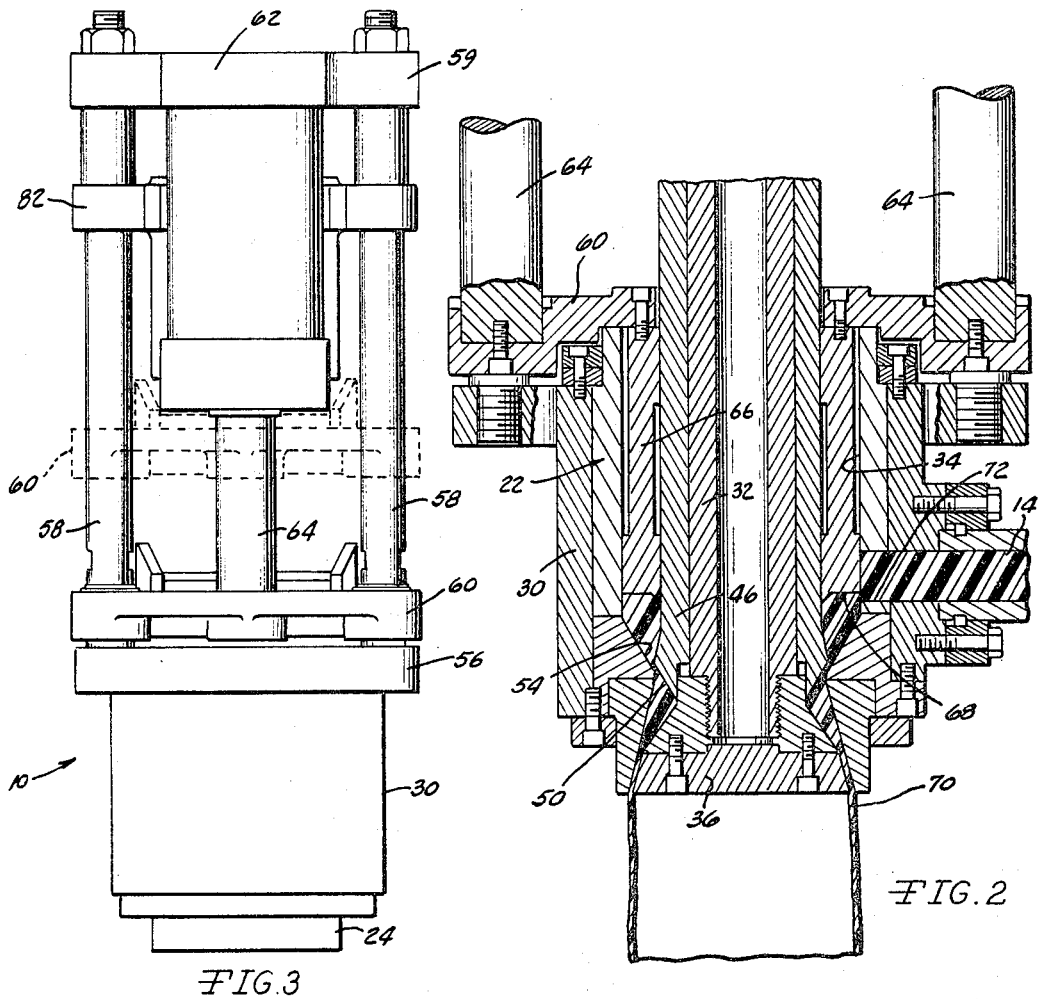
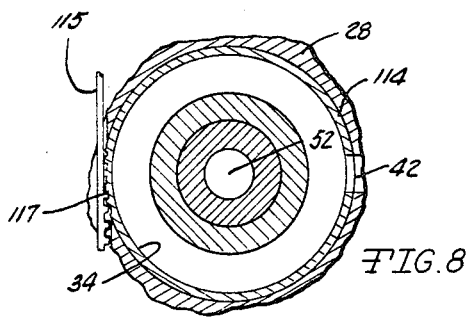

United States Patent Office 3,386,132
Patented June 4, 1968

3,386,132
EXTRUSION APPARATUS
Edward Fischer, Saline, Mich., assignor to Hoover Ball and Bearing Company, Saline, Mich., a corporation of Michigan
Filed Oct. 22, 1965, Ser. No. 501,147
10 Claims. (Cl. 18—14)

ABSTRACT OF THE DISCLOSURE

Apparatus for use in conjunction with blow molding of plastic material to form hollow articles which includes a plasticizer for plasticizing the material and a die head assembly connected to the discharge end of the plasticizer from which tubular parisons of desired shape and wall thickness can be extruded for blow molding operations. The die head assembly has an annular accumulation chamber into which the plasticizer discharges the plastic material and an annular piston or plunger is provided for discharging the accumulated material through an annular orifice in the form of a tubular parison. Control means are provided for selectively varying the wall thickness of the parison.

---

This invention relates generally to extrusion apparatus and more particularly to improved extrusion apparatus of the type in which a flowable material, such as plastic, is forced through an annular die opening.

In some molding apparatus, such as blow molding machines, plastic which has been heated and worked to a semi-fluid or flowable state is extruded through an annular die opening or discharge orifice so as to form a tubular parison that is subsequently expanded into conformity with a mold cavity. The principal object of this invention is to provide apparatus of this type in which the material issuing from all points in the discharge orifice is subjected to the same pressure so that the material flows from all points at a uniform rate.

It is an object of this invention, therefore, to provide improved extrusion apparatus of the above-described type.

Further objects of this invention are to provide improved extrusion apparatus in which the thickness of material issuing from the die opening can be selectively and continuously adjusted, the supply of the material to the die opening can be cut off if desired, and in which an annular accumulator in direct communication with the die opening is completely free of obstructions and is of a constant shape in vertical section so that a uniform, smooth, and undistorted flow of plastic will take place at the orifice during each discharge of plastic therefrom.

Further objects, features and advantages of this invention will become apparent from a consideration of the following description, the appended claims, and the accompanying drawing in which:

FIGURE 2 is a fragmentary side elevational view of the improved apparatus of this invention illustrated similarly to FIG. 1, showing the apparatus in position following extrusion of material through the die opening;

FIGURE 3 is a front view of the apparatus of this invention, showing the apparatus in its FIG. 2 position in solid lines and in its FIG. 1 position in broken lines;

FIGURE 4 is a top view of the apparatus of this invention with some parts broken away and other parts shown in section for the purpose of clarity;

FIGURE 5 is a side elevational view like FIG. 2, of a form of the apparatus of this invention utilizing a rectangular die opening;

Figure 1:
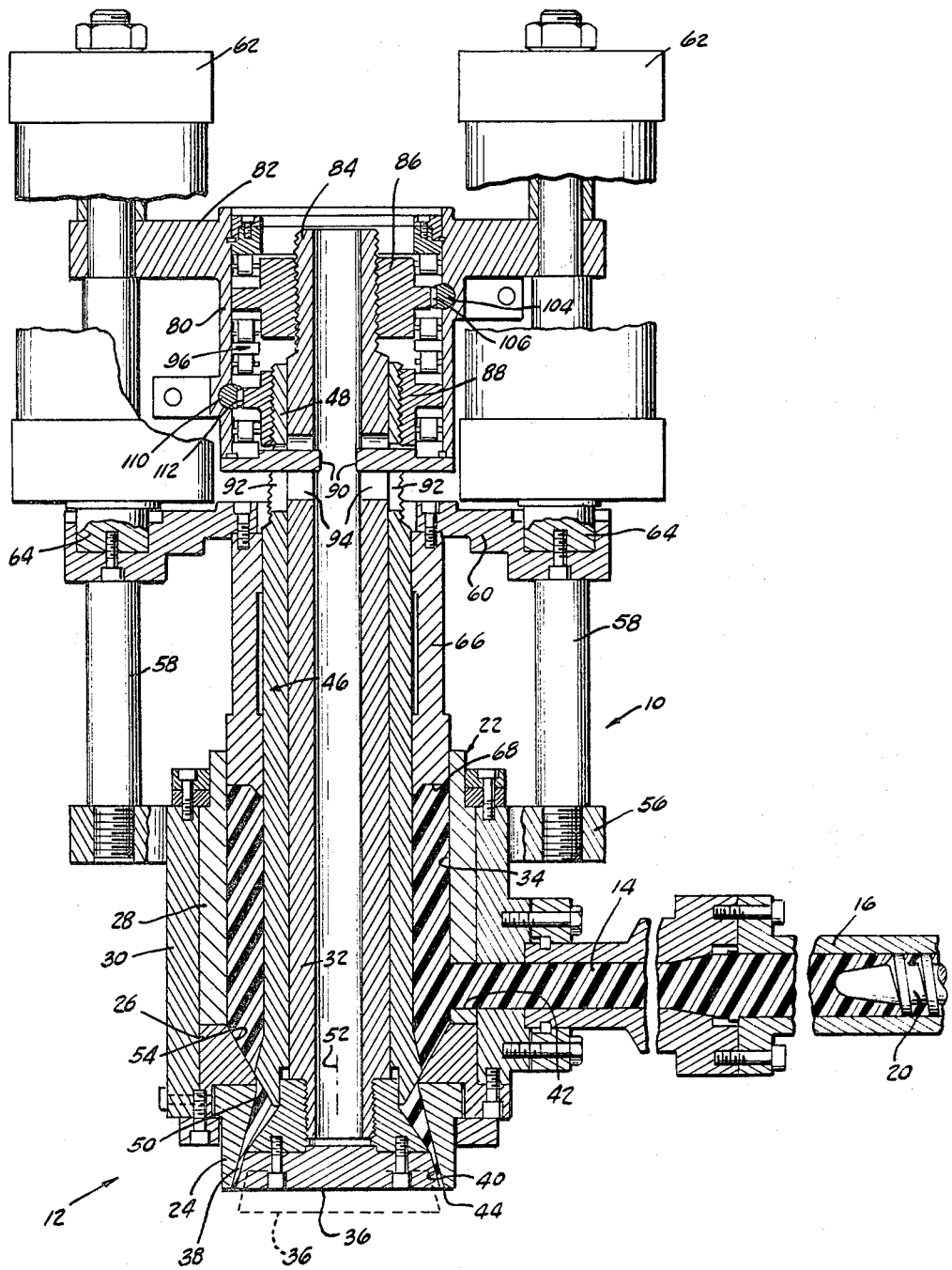
FIGURE 1 is a side elevational view of the improved extrusion apparatus of this invention, with some parts broken away and other parts shown in section for the purpose of clarity, and showing the apparatus in assembly relation with plastic supply apparatus, only a fragmentary portion of which is shown, with the apparatus in position preparatory to extrusion of material through the die opening.

FIGURES 6 and 7 are sectional views of the apparatus of this invention looking along the lines 6—6 and 7—7, respectively, in FIG. 5; and FIGURE 8 is a transverse sectional view through the die head in a modified form of the apparatus of this invention which has been equipped with a rotary valve capable of closing the opening through which extrudable material is supplied to the apparatus.

With reference to the drawing, the extrusion apparatus of this invention, indicated generally at 10, is illustrated in FIG. 1 as including a die head 12 which is continuously supplied with extrudable material 14 in a flowable or semi-fluid condition. In the illustrated embodiment of the invention, the material 14 is heated plastic in a semi-fluid condition that is supplied by conventional apparatus which includes a barrel 16 in which a screw 20 is rotated.

The die head 12 includes an upright outer sleeve unit 22 formed by a lower die ring 24, an intermediate back pressure ring 26, and an upper sleeve member 28, all of which are arranged in a coaxial relation and are supported on a main frame tube member 30. An upright hollow mandrel 32 is disposed coaxially within the sleeve unit 22, as shown in FIG. 1, and is spaced from the sleeve unit 22 so as to form an annular chamber or passage 34 therebetween. The mandrel 32 includes a removable lower disc portion 36 which has a downwardly and outwardly inclined outer surface 38 disposed in a spaced relation with a similarly inclined internal surface 40 formed on the die ring 24. The sleeve unit 22 is formed with a side wall opening 42 through which the material 14 can flow from the barrel 16 into the annular chamber 34. This material can then be extruded from the die head 12 through the annular opening 44 formed between the mandrel portion 36 and the die ring 24.

The die opening 44, which forms a discharge orifice for the chamber 34, is of a width determined by the spacing of the mandrel and die ring surfaces 38 and 40, respectively. This spacing is in turn dependent on the relative axial positions of the mandrel 32 and the sleeve unit 22. For example, to enlarge the width of the opening 44, from that shown in solid lines in FIG. 1, the mandrel 32 is movable downwardly relative to the sleeve unit 22 so as to move the mandrel portion 36 to the position shown in broken lines in FIG. 1, for example, to thus increase the width of the die opening 44 by a considerable amount.

A tubular valve member 46 is positioned relative to the chamber 34 such that the valve member 46 can shut off the communication of the chamber 34 and the discharge orifice 44. In the illustrated embodiment of the invention, the valve member 46 is of tubular shape and is slidably mounted on the outer surface of the mandrel 32. The valve member 46 has an externally threaded upper portion 48 and is provided at its lower end with an annular surface 50 which is inclined upwardly and outwardly relative to the axis 52 of the mandrel 32, the chamber 34, and the sleeve unit 22. As shown in FIG. 1, the back pressure ring 26 is formed with a similarly inclined annular surface 54 with which the valve member surface 50 is engageable when the valve member 46 is moved downwardly on the mandrel 32 to the position shown in FIG. 1. The back pressure ring surface 54 thus constitutes a valve seat on the sleeve unit 22 disposed between the supply opening 42 and the discharge orifice 44. As shown in FIG. 2, the valve member 46 is movable upwardly to an open position spaced from the valve seat 54, as well as to the closed position shown in FIG. 1.

The upper end of the frame tube 30 is connected to a substantially horizontal frame plate 56 on which four upwardly extending guide rods 58 are mounted. A pair of frame plates 59, disposed above the frame plate 56, secure the upper ends of the guide rods 58. A pressure plate 60 is guidably supported on the rods 58 for movement between a lower position shown in FIG. 2 and in solid lines in FIG. 3 and an upper position shown in FIG. 1 and in broken lines in FIG. 3. A pair of hydraulic cylinder assemblies 62, each of which has a piston rod 64 secured to the pressure plate 60, are connected to the upper frame plates 59 and are operable to move the pressure plate 60 downwardly from its upper position to its lower position.

An annular extrusion piston or plunger 66, slidably supported on the valve member 46 and secured at its upper end to the pressure plate 60, projects into the upper end of the chamber 34 as shown in FIG. 1. When the cylinder assemblies 62 are actuated to move the pressure plate 60 to it lower position, shown in FIGS. 2 and 3, the piston or plunger 66 is moved downwardly in the chamber 34 so as to force material therein through the die opening 44 and form a tubular parison 70 which extends downwardly from the orifice 44. In its lower position, the piston 66 has its lower end 68 disposed above the lower end 72 of the supply opening 42 for the chamber 34. As a result, when the valve member 46 is subsequently moved to a close position, the pressure of plastic entermoved to a close position, the pressure of plastic entering the chamber 34 through the supply opening 42 exerts an upward force on the lower end 68 of the piston 66 sufficient to move the piston 66 from its position shown in FIG. 2 to its position shown in FIG. 1.

It can thus be seen, that by alternately moving the valve member 46 between its open and closed positions shown in FIGS. 2 and 1, respectively, and by alternately actuating the hydraulic cylinder assemblies 62 so as to move the piston 66 downwardly from its FIG. 1 position to its FIG. 2 position and allowing the plastic 14 to move the piston 66 upwardly from its FIG. 2 position to its FIG. 1 position, successive parisons 70 can be continuously formed at the die opening 44. Fluid is pumped into the cylinders 62 in a conventional manner to move the pressure plate 60 downwardly. During upward movement of the piston 66, the cylinders 62 are connected to tank through a conventional pressure regulating valve so as to maintain sufficient pressure on piston 66 to insure complete filling of chamber 34 during upward movement of the piston 66.

A housing or casing 80 is supported on a plate 82 carried by the guide rods 58 and located at the upper end of the die head 12. The mandrel 32 has a threaded upper end portion 84 which is located in the casing 80. A nut 86 is threaded on the mandrel portion 32. A similar nut 88 is positioned in the casing 80 and threaded on the threaded upper end portion 48 of the valve member 46. Retainer rods or bars 90 on the lower end of the casing 80 project radially inwardly through slots 92 and 94 in the valve member 46 and the mandrel 32, respectively. The purpose of the retainer rods 90 is to prevent realtive rotation of the mandrel 32 and the valve member 46.

The nuts 86 and 88 are confined in the casing 80 in a spacer assembly, indicated generally at 96, so that the nuts 86 and 88 cannot move in a vertical direction, but are free to rotate. As a result, when the nut 86 is rotated, the screw threaded section 84 of the mandrel 32 is moved vertically to in turn move the mandrel lower end portion 36 vertically to adjust the width of the die opening 44. On rotation of the nut 88, the valve member 46 is movable vertically between its closed and open positions shown in FIGS. 1 and 2, respectively.

A pair of fluid actuated cylinder assemblies 98 and 100 (FIG. 4) are provided for turning the nuts 86 and 88, respectively. The cylinder assembly 98 has its piston rod 102 connected to a rack 104 which meshes with gear teeth 106 formed on the periphery of the nut 86. Consequently, on actuation of the cylinder assembly 98 to reciprocate the rack 104, the nut 86 is rotated in opposite directions to in turn provide for up and down movement of the valve member 46. The cylinder assembly 100 has its piston rod 108 connected to a rack 110 positioned in meshing engagement with teeth 112 formed on the periphery of the nut 88. As a result, on reciprocation of the piston rod 108, the rack 110 is operable to rotate the nut 86 so as to raise or lower the mandrel 32 relative to the die sleeve unit 22 to adjust the width of the die opening 44. The threads on the valve member portion 48 have a longer lead than the threads on the mandrel portion 84 since quick response of valve member 46 is desired and fine adjustment of the mandrel 32 is desired.

In the operation of the extrusion apparatus 10, assume that the valve member 46 is in its closed position shown in FIG. 1, assume that the chamber 34 is filled with plastic, and that the piston 66 is in its upper position shown in FIG. 1. The cylinder assembly 100 is actuated to rotate the nut 88 so as to move the valve member 46 to its open position shown in FIG. 2. The cylinder assemblies 62 are then operated to move the valve member 66 downwardly in the chamber 34 so as to force the plastic therein outwardly through the die opening 44 at as rapid a rate as possible. It is desirable to have the pressure exerted on the pastic in the chamber 34 by the piston 66 substantially equal to the pressure exerted on the plastic 14 entering through the chamber opening 42 by the screw 20. If this situation exists, during downward movement of the piston 66, plastic does not flow from the chamber 34 out through the opening 42, and plastic likewise does not flow into the chamber 34 through the opening 42. However, whether or not this ideal condition exists, the effect on the parison 70 is minimum so long as the variation from this ideal condition is not great. If desired, the sleeve unit 22 can be provided with a rotary valve 114 (FIG. 8) which is movable to a position closing the opening 42, by a rack 115 engageable with gear teeth 117 on the valve 114 during downward movement of the piston 66.

In the apparatus 10 of this invention, the width of the chamber 34 in all horizontal planes extending between the lower end 68 of the piston 66 and the die opening 44 is uniform around the periphery of the chamber 34. Stated otherwise, the shape of the chamber 34 between the piston 66 and the orifice 44 is the same in all vertical planes extending through the axis 52. As a result, the pressure on the material issuing from each point in the annular opening 44 is the same. This is advantageous because it provides for a parison 70 which is not distorted by non-uniform flow and which can be formed in non-circular shapes. When the piston 66 has reached its lower position shown in FIG. 2, cylinder assembly 100 is actuated to move valve member 46 into closed position engaged with seat 54. Cylinder assemblies 62 are then connected to tank so that the pressure of material 14 entering chamber 34 raises piston 66 so as to return it to the FIG. 1 position and fill chamber 34. Cylinder 100 is then actuated to open valve member 46 and the above sequence is repeated.

Another advantage of apparatus 10 is the provision therein for programmed control of the thickness of parison 70. During downward movement of piston 66, cylinder assembly 98 can be continuously operated to vary the position of mandrel 32 and thus the width of the orifice 44. A series of adjusting screws 55, only one of which is shown, can be used to place the die ring 24 off center with respect to mandrel 32 if a parison thicker on one side is desired.

Apparatus for forming a rectangular parison is illustrated in the modified form 10a of the extrusion apparatus of this invention illustrated in FIGS. 5, 6 and 7. In the apparatus 10a, which is illustrated in a position corresponding to the position of the apparatus 10 shown in FIG. 2 in which the apparatus 10a has just completed the extrusion of a parison 120 which is of rectangular shape, similar numerals are used to indicate similar parts in the apparatus 10. In the apparatus 10a, the chamber 34a, corresponding to the chamber 34 in the apparatus 10, is rectangular and is supplied with plastic, or other molding material, through a side opening 42a in a sleeve unit 22a. The apparatus 10a also differs from the apparatus 10 in that the inner wall of the chamber 34a is formed by a mandrel and valve assembly 122 which includes a solid non-tubular valve member 124 having an inclined surface 126 engageable with a valve seat 128 and a mandrel 130 which is movable up and down, in response to up and down movement of supporting rods 132 so as to vary the width of the die opening 134. The rods 132 extend through openings in the member 124 which is separately supported on rods 136.

The extrusion apparatus 10a operates like the apparatus 10. In other words, the valve surface 126 is first engaged with the valve seat 128 so that plastic entering the chamber 34a will move a piston 66a upwardly in the chamber. When the piston 66a has reached its upper limit of movement, the valve surface 126 is moved off the valve seat 128 to the position shown in FIGS. 5 and 6 and the piston 66a is moved downwardly in the chamber 34a so as to extrude plastic therein through the die opening 134 to form the rectangular parison 120 of uniform wall thickness in all horizontal planes. Since the path through which the plastic flows from the piston 66a to the die opening 134 is of a uniform size and shape in all vertical planes through the axis 140 of the sleeve assembly 22a, the plastic will issue uniformly under the same pressure from all points in the discharge orifice 134. As a result, the parison 120 will be of uniform thickness and without any distortions in shape. A rectangular parison, or a parison of any other desired shape can be particularly advantageous in the formation of many articles. During extrusion of the moldable material through the die opening 134, the mandrel 130 can be continuously moved so as to continuously vary the thickness of the parison 120 to adapt it to a particular requirement.

From the above description it is seen that this invention provides extrusion apparatus 10 and 10a which is versatile and can be operated to rapidly form a parison of uniform thickness and of a desired annular shape in cross section. It is to be understood that the terms "annular" and "tubular" as used herein are inclusive of any shape involving continuous inner and outer walls extending completely about an axis, irrespective of whether such shape is circular.

It will be understood that the extrusion apparatus which is herein disclosed and described is presented for purposes of explanation and illustration and is not intended to indicate limits of the invention, the scope of which is defined by the following claims.

What is claimed is:

1. In extrusion apparatus for producing tubular parisons of plastic material for blow molding purposes, a die head including a sleeve unit having an axis and a discharge end open to atmosphere, a mandrel disposed concentrically within said sleeve unit adjacent the discharge end thereof so as to form therewith an annular discharge orifice at said discharge end of said sleeve unit through which said plastic material can be discharged for producing said parisons, a valve member concentrically mounted within said sleeve unit so as to form an annular chamber therebetween which communicates with and is concentric with said orifice, means for supplying plastic material in a flowable condition to said chamber for discharge through said orifice, said valve member being mounted for movement axially of said sleeve unit to a position engaged therewith in which said valve member blocks communication of said chamber and said orifice at a position between said supply means and said orifice, and an annular plunger mounted in said chamber for movement toward said orifice to force material in said chamber out said orifice so as to form a tubular parison, said chamber being unobstructed and of a constant width in cross section in any plane extending transverse to said axis between said plunger and said orifice so that material will issue from all points in said orifice at a uniform rate.

2. In extrusion apparatus for producing tubular parisons of plastic material for blow molding purposes, a die sleeve unit having an axis and a discharge end open to atmosphere, said sleeve unit being formed adjacent said discharge end with an annular radially inwardly extending valve seat, means including a valve member disposed concentrically within said sleeve unit so as to form therewith an annular chamber terminating in an annular discharge orifice open to atmosphere at said discharge end of said sleeve unit through which said plastic material can be discharged for producing said parisons, said sleeve unit having an opening in one side through which extrudable plastic material in a semi-fluid condition can be supplied to said chamber, said valve member being mounted within said sleeve unit for movement axially thereof to a position engaged with said valve seat so as to close said chamber at a position between said opening and said orifice, an annular plunger mounted in said chamber for movement toward said orifice to force extrudable plastic material in said passage out said orifice when said valve member is spaced from said seat so as to form a tubular parison, said passage being unobstructed and of a constant size and shape in vertical cross section in all planes extending radially from said axis between said plunger and said orifice so that plastic material will be extruded from all points in said orifice at a uniform rate, and stop means for limiting movement of said plunger toward said orifice to a position of said plunger in which at least a portion of said opening is between said plunger and said orifice so that on movement of said valve member to a position engaged with said seat so as to block flow of plastic material to said orifice further supply of plastic material to said chamber can be utilized to move said plunger away from said orifice.

3. The structure according to claim 2 in which said chamber and said discharge orifice are of non-circular shape so as to form tubular parisons of non-circular shape.

4. In a blow molding machine, a die head for extruding tubular parisons adapted to be blown to hollow articles comprising a sleeve unit having a vertical axis and a discharge end, a mandrel disposed concentrically within said sleeve unit so as to form therewith an annular passage terminating in an annular discharge orifice open to atmosphere at said discharge end of said sleeve unit, means for supplying plastic material in a semi-fluid condition to said passage, a valve member slidably mounted on said mandrel for movement axially of said sleeve unit to a position engaged therewith in which said valve member closes said passage at a position between said supply means and said orifice, and an annular plunger mounted in said passage for movement toward said orifice to force plastic material in said passage out said orifice as a depending tubular parison conforming to the shape of said discharge orifice, said passage being unobstructed and a uniform thickness in cross section in all planes transverse to said axis between said plunger and said orifice so that plastic material will issue from all points in said orifice at a uniform rate.

5. In extrusion apparatus for blow molding purposes, a die head assembly for extruding annular parisons comprising an upright die sleeve unit having an opening in one side through which extrudable material in a semi-fluid condition can be supplied to the interior of said sleeve unit, a mandrel disposed in a coaxial relation with a portion of said sleeve unit, said sleeve unit and said mandrel having substantially parallel spaced surface portions disposed at one end of said sleeve unit and inclined with respect to the axis thereof so as to form an annular discharge orifice open to atmosphere at one end of said sleeve unit from which annular parisons can be extruded, the thickness of said orifice being determined by the amount of spacing of said surface portions which spacing is in turn adjustable by relative axial movement of said mandrel and said sleeve unit, means in said sleeve unit forming an annular passage communicating at one end with said discharge orifice, means providing an annular valve seat on said sleeve unit at a position between said material supply opening and said discharge orifice, a valve member mounted in said passage for up and down movement between an open position spaced from said seat and a closed position engaged with said seat, an annular piston mounted in said passage for up and down movement between a raised position above said supply opening and a lower position above the lower edge of said opening, said piston being operable on downward movement from said raised position to force material out of said die opening, said piston being movable upwardly from said lower position by material entering said passage from said supply opening when said valve member is in said closed position, means operatively associated with the upper end of said valve member for selectively moving said valve member between said open and closed positions, and means for selectively and continuously relatively moving said sleeve unit and mandrel to provide for the adjustment of the thickness of said discharge orifice.

6. The structure according to claim 5 in which said means for moving said valve member includes a nut threaded on the upper end of said valve member and confined against vertical movement, gear means on said nut, rack means disposed in meshing engagement with said gear means, and power means connected in driving relation to said rack.

7. The structure according to claim 6 in which said means for relatively moving said sleeve unit and mandrel includes a nut threaded on said mandrel and confined against vertical movement, gear means on said nut, rack means disposed in meshing engagement with said gear means, and power means connected in driving relation to said rack.

8. The structure according to claim 5 further including a rotary valve member concentric with said sleeve unit and operable to close with said sleeve unit and operable to close said supply opening during downward movement of said piston.

9. In a blow molding machine, a die head assembly for forming tubular parisons of plastic material adapted to be blown subsequently to hollow articles comprising an upright die sleeve unit having an opening in one side through which plastic material in a semi-fluid condition can be supplied to the interior of said sleeve unit, a mandrel disposed in a coaxial relation with at least a portion of said sleeve unit, said sleeve unit and said mandrel having substantially parallel spaced surface portions disposed at one end of said sleeve unit and inclined with respect to the axis thereof so as to form an annular discharge orifice open to atmosphere at one end of said sleeve unit from which tubular parisons can be extruded, the thickness of said orifice being determined by the amount of spacing of said surface portions which spacing is in turn adjustable by relative axial movement of said mandrel and said sleeve unit, means in said sleeve unit forming an annular passage concentric with and communicating at one end with said discharge orifice, means providing an annular valve seat on said sleeve unit at a position between said plastic material supply opening and said discharge orifice, a valve member mounted in said passage for up and down movement between an open position spaced from said seat and a closed position engaged with said seat, an annular piston member mounted in said passage for up and down movement between a raised position above said supply opening and a lower position above the lower edge of said opening, said piston being operable on downward movement from said raised position to force plastic material out of said annular discharge orifice, said piston being movable upwardly from said lower position by plastic material entering said passage from said supply opening when said valve member is in said closed position, means operatively associated with the upper end of said valve member for selectively moving said valve member between said open and closed positions, and means for relatively moving said sleeve unit and mandrel to provide for the adjustment of the thickness of said discharge orifice so that the wall thickness of the extruded tubular parisons can be selectively established and varied.

10. The structure according to claim 9 in which the passage between said piston and said orifice is completely unobstructed and of substantially the same shape in all vertical planes so that the pressure on the plastic material issuing from said orifice is substantially the same at all points in said orifice.

References Cited

UNITED STATES PATENTS

| | | | |
|---|---|---|---|
| 3,084,382 | 4/1963 | Stuchbery | 18—5 |
| 3,109,198 | 11/1963 | Guignard | 18—14 |
| 3,158,263 | 11/1964 | Scribner | 18—12 |
| 3,196,592 | 7/1965 | Cheney | 18—5 |
| 3,329,996 | 7/1967 | Marcus et al. | 18—5 |

WILBUR L. McBAY, *Primary Examiner.*